United States Patent
Xu et al.

(10) Patent No.: US 9,633,267 B2
(45) Date of Patent: Apr. 25, 2017

(54) ROBUST WINDSHIELD DETECTION VIA LANDMARK LOCALIZATION

(71) Applicant: Xerox Corporation, Norwalk, CT (US)

(72) Inventors: Beilei Xu, Penfield, NY (US); Yusuf O. Artan, Ankara (TR); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/245,319

(22) Filed: Apr. 4, 2014

(65) Prior Publication Data

US 2015/0286883 A1    Oct. 8, 2015

(51) Int. Cl.
| | | |
|---|---|---|
| G06K 9/00 | (2006.01) | |
| G06K 9/46 | (2006.01) | |
| G06K 9/62 | (2006.01) | |
| G06T 7/00 | (2017.01) | |
| H04N 5/33 | (2006.01) | |
| G08G 1/04 | (2006.01) | |
| G08G 1/017 | (2006.01) | |

(52) U.S. Cl.
CPC ..... *G06K 9/00832* (2013.01); *G06K 9/00228* (2013.01); *G06K 9/00785* (2013.01); *G06K 9/00838* (2013.01); *G06K 9/4638* (2013.01); *G06K 9/6202* (2013.01); *G06K 9/6206* (2013.01); *G06K 9/6267* (2013.01); *G06T 7/0044* (2013.01); *G06T 7/0081* (2013.01); *G08G 1/0175* (2013.01); *G08G 1/04* (2013.01); *H04N 5/33* (2013.01); *G06T 2207/10004* (2013.01); *G06T 2207/20076* (2013.01); *G06T 2207/20132* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 5,487,116 A | * | 1/1996 | Nakano | G06K 9/00798 382/104 |
| 7,898,402 B2 | * | 3/2011 | Odate | G06K 9/00362 340/438 |

(Continued)

OTHER PUBLICATIONS

Article entitled Face Detection, Pose Estimation, and Landmark Localization in the Wild, Xiangxin Zhu and Deva Ramanan, pp. 1-8.

(Continued)

*Primary Examiner* — Tsung-Yin Tsai
(74) *Attorney, Agent, or Firm* — Fay Sharpe LLP

(57) ABSTRACT

A system and method that includes training a classifier using uniquely defined landmark points along the windshield region based on an elastic deformation model. The deformation model uses mixtures of trees with a shared pool of parts and can be globally optimized with dynamic programming and still capture much relevant global elastic structure. Once a candidate area is identified in the scene, a learned threshold is applied to the classification score of the candidate area to determine if the candidate area is a windshield. The identified area is then cropped out for further downstream process.

14 Claims, 8 Drawing Sheets
(6 of 8 Drawing Sheet(s) Filed in Color)

(56) References Cited

U.S. PATENT DOCUMENTS

| | | | | |
|---|---|---|---|---|
| 2002/0133319 A1* | 9/2002 | Tang | G05B 19/4097 | 703/1 |
| 2002/0183986 A1* | 12/2002 | Stewart | G06F 17/5018 | 703/2 |
| 2006/0165277 A1* | 7/2006 | Shan | G06K 9/00785 | 382/159 |
| 2007/0285809 A1* | 12/2007 | Takahashi | G08G 1/017 | 359/851 |
| 2008/0175438 A1* | 7/2008 | Alves | G08G 1/0175 | 382/105 |
| 2008/0219505 A1* | 9/2008 | Morimitsu | G06K 9/00201 | 382/103 |
| 2011/0293141 A1* | 12/2011 | Robert | G06K 9/00785 | 382/103 |
| 2012/0069183 A1* | 3/2012 | Aoki | G07B 15/063 | 348/148 |
| 2012/0212617 A1* | 8/2012 | Wang | G08G 1/0175 | 348/149 |
| 2013/0051625 A1* | 2/2013 | Fan | G06K 9/00234 | 382/104 |
| 2013/0081748 A1 | 4/2013 | Miller et al. | | |
| 2013/0147959 A1* | 6/2013 | Wang | G06K 9/00838 | 348/149 |
| 2013/0336538 A1* | 12/2013 | Skaff | G06K 9/00785 | 382/104 |
| 2014/0147008 A1* | 5/2014 | Aoki | G08G 1/0175 | 382/104 |
| 2015/0279036 A1* | 10/2015 | Artan | G06K 9/00771 | 382/159 |
| 2015/0286885 A1* | 10/2015 | Bulan | G06K 9/4642 | 382/104 |
| 2016/0148072 A1* | 5/2016 | Chan | G06K 9/00536 | 382/104 |

OTHER PUBLICATIONS

U.S. Appl. No. 13/859,047, filed Apr. 9, 2013.

* cited by examiner

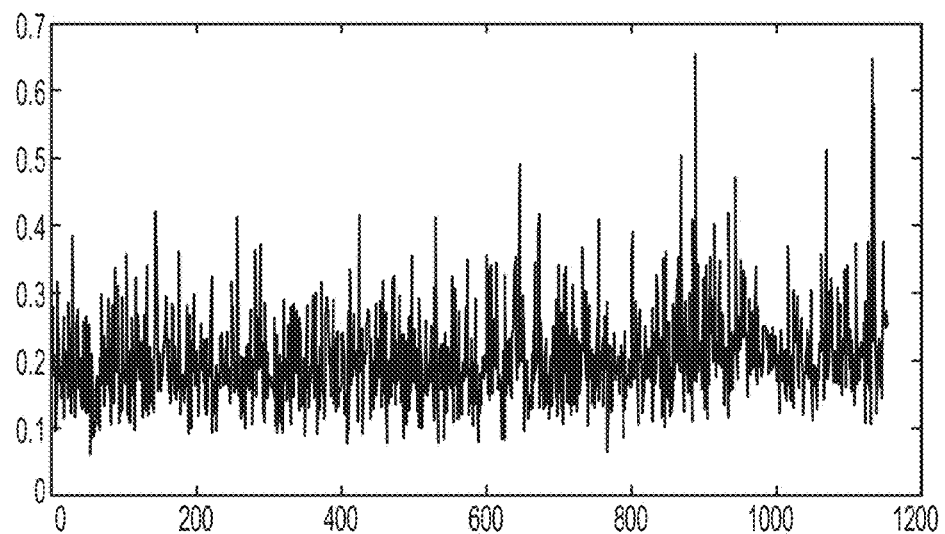
FIG. 7
 
FIG. 8  FIG. 9

ROBUST WINDSHIELD DETECTION VIA LANDMARK LOCALIZATION

BACKGROUND

The present disclosure relates to image analysis, and more particularly to localization of a target object.

In order to manage ever increasing traffic numbers, special lanes are introduced that allow only traffic with more than a certain number of occupants inside a vehicle. These managed lanes include carpool, diamond, or High Occupancy Vehicle (HOV) lanes that are intended to reduce the total number of cars (for a given number of people) on the highway and thus to speed up travel. The overall benefits are obvious in multiple areas: the managed lanes reduce traffic congestion, reduce wasted commuting time, reduce fuel consumption, and decrease pollution. Managed lanes also include High Occupancy Tolling (HOT) lanes where a single occupant vehicle can use the managed lane upon payment of a toll. The toll is often dynamically set based on real-time traffic congestion so as to maintain a minimum average vehicle speed in the managed lane. Managed lanes, such as HOV or HOT lanes, are typically the left most lanes of a highway and are often denoted by diamond markings on the pavement within the lanes and/or signage. Sometimes they are separated from the general purpose lanes through the use of barriers. Some managed lanes require at least two vehicle occupants, denoted as a "2+" lane, and other managed lanes require at least three vehicle occupants, denoted as a "3+" lane.

In order to be effective and maintain integrity within the system, adherence to the occupancy numbers has to be enforced. Since managed lanes generally give a clear advantage in terms of travel time, people are tempted to cheat the system and use the lane even if their vehicle does not carry the sufficient number of occupants (or is otherwise ineligible) required. This tendency to cheat sometimes also includes efforts to avoid detection, including the use of dummies or mannequins to simulate additional occupants.

To enforce the rules of managed lanes, current practice requires dispatching law enforcement officers at the side of HOV/HOT lanes to visually examine passing vehicles. This method is expensive, difficult, potentially unsafe, and ultimately ineffective as few violators are actually caught and ticketed. An alternate method of monitoring managed lanes is image-based automatic enforcement which requires identification and classification of image features (e.g., faces, seats, seat belts, etc.) behind a windshield that are visible to the camera to distinguish a driver+passenger configuration vs. a driver only configuration. This method is highly dependent upon camera placement and trigger timing to obtain a clear image of the interior of a vehicle. In most locations it is not possible to aim the camera such that its field of view is tightly focused on only the windshield of all oncoming cars. The location of the windshield in captured images will vary from car to car depending on driver behavior and vehicle design, thus reducing the effectiveness of such an image based approached. As such, a need exists for accurate localization of the windshield region from a captured image to efficiently and effectively identify violators in managed lanes.

One approach for identifying the location of a windshield region is set forth in commonly-assigned U.S. patent application Ser. No. 13/859,047 filed on Apr. 9, 2013 wherein a target vehicle within a captured image can be identified and localized based on prior knowledge of geometric and spatial relationships. Objects of interest on the target vehicle can then be identified and utilizing a priori knowledge of the relative geometric relationships between the identified objects, the area of the image containing the windshield of the target vehicle can be identified and localized for downstream processing to detect vehicles in violation of HOV/HOT lane requirements or other violations, such as seat belt requirements. While this approach is suitable for many applications, there remains a need for accurate localization of the windshield region from a captured image to efficiently and effectively identify violators in managed lanes.

BRIEF DESCRIPTION

A windshield localization method for occupancy detection to support HOV/HOT lane enforcement is described here. In one exemplary embodiment, a method includes training a classifier using uniquely defined landmark points along the windshield perimeter based on an elastic deformation model. The deformation model uses mixtures of trees with a shared pool of parts and can be globally optimized with dynamic programming and still capture much relevant global elastic structure. Once a candidate area is identified in the scene, a learned threshold is applied to the classification score of the candidate area to determine if the candidate area is a windshield. The identified area is then cropped out for further downstream processing.

According to one aspect, a system configured to perform landmark-based image analysis for localization of a windshield within an image comprises an image capture device operably connected to a data processing device that captures an image of a target vehicle, and a processor-usable medium embodying computer code, said processor-usable medium being coupled to said data processing device, said computer program code comprising instructions executable by said processor and configured for: identifying a plurality of landmarks associated with a windshield portion of a vehicle, at least one of the landmarks corresponding to a side view mirror adjacent the windshield, and sorting each of the landmarks via a tree structure defined by spatial relationships between one or more of the landmarks.

The computer program code comprising instructions executable by said processor can be further configured for calculating a classification score. The computer program code comprising instructions executable by said processor can be further configured for comparing the classification score to a threshold value and, if the classification score exceeds the threshold value, cropping the region identified by the landmark. The classification score can be generated using: $S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, $App(I,L)$ sums the appearance evidence for placing a template for part i at location $l_i$ for $i=1, 2, \ldots, N_L$, and $Shape(L)$ scores the specific spatial arrangement of parts L.

The landmark points can define a tree having start and end points each on a straight line segment thereby minimizing the impact of relative position variation on windshield identification. The start and end points of the tree can be at a lower center portion of the windshield. The computer program code comprising instructions executable by said processor can be further configured for detecting violations of lane requirements in managed lanes.

In accordance with another aspect, a computer implemented method of enhancing an image comprises identifying a plurality of landmarks associated with a windshield portion of a vehicle, at least one of the landmarks in at least one mixture corresponding to a side view mirror adjacent the windshield, and sorting each of the landmarks via a tree structure defined by spatial relationships between one or more of the landmarks.

The method can further comprise calculating a classification score based on the sorted landmarks. The method can further comprise comparing the classification score to a threshold value and, if the classification score exceeds the threshold value, cropping the region identified by the landmarks. The classification score can be generated using: $S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, App(I,L) sums the appearance evidence for placing a template for part i at location $l_i$ for $i=1, 2, \ldots, N_L$, and Shape(L) scores the specific spatial arrangement of parts L.

The landmark points can define a tree having start and end points each on a straight line segment thereby minimizing the impact of relative position variation on windshield identification. The start and end points of the tree can be at a lower center portion of the windshield. The method can further comprise detecting violations of lane requirements in managed lanes.

In accordance with another aspect, a non-transitory computer-usable medium for performing landmark-based image analysis for localization of a windshield within an image, said computer-usable medium embodying a computer program code, said computer program code comprising computer executable instructions configured for: identifying a plurality of landmarks associated with a windshield portion of a vehicle, at least one of the landmarks corresponding to a side view mirror adjacent the windshield, and sorting each of the landmarks via a tree structure defined by spatial relationships between one or more of the landmarks.

The instructions can further comprise calculating a classification score based on the sorted landmarks. The instructions can further comprise comparing the classification score to a threshold value and, if the classification score exceeds the threshold value, cropping the region identified by the landmark points. The classification score can be generated using: $S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, App(I,L) sums the appearance evidence for placing a template for part i at location $l_i$ for $i=1, 2, \ldots, N_L$, and Shape(L) scores the specific spatial arrangement of parts L.

The landmark points can define a tree having start and end points each on a straight line segment thereby minimizing the impact of relative position variation on windshield identification. The start and end points of the tree can be at a lower center portion of the windshield.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 7 is a graph of error rate for a set of images analyzed in accordance with the present disclosure FIGS. 8 and 9 are examples of images where an error rate exceeds a threshold;

DETAILED DESCRIPTION

The present disclosure sets forth an occupancy detection system and method for automatic or semi-automatic High Occupancy Vehicle/High Occupancy Tolling (HOV/HOT) lane enforcement. The system and method rely on a camera based imaging system to capture images/videos in the near-infrared (NIR) band through the windshield of an incoming vehicle. The detection algorithm will then examine the images/videos to determine any candidate HOV/HOT violators for law-enforcement officers to take action on. If the front passenger seat is unoccupied, then the vehicle is classified as a candidate violator. For a candidate violator, an evidence package consisting of a front seat image, a rear seat image, a license plate image, and a color vehicle image can be generated and sent to a downstream police officer or back office. In one workflow, the police officer reviews the evidence package and determines whether the vehicle should be pulled over and the driver should be ticketed. In another workflow, the police officer is in the back office at the police station and reviews the evidence package and determines whether the owner is ticketed. The second workflow is similar to what is currently done in "Red Light" camera based enforcement systems.

The detection system either can identify certain objects such as faces, car seats, and seatbelts that are associated with the presence or absence of occupants or uses a machine-learning based classifier that detects violations by using a global image feature representation of captured images. Although either of the aforementioned approaches can be performed on the whole image, there are many advantages to focus on a region of interest (ROI) around the windshield. In addition to substantial computational cost and time savings, a localized ROI around the windshield can potentially produce less false positives. Moreover, a defined ROI region enables us to incorporate certain geometric logic in the process, e.g., front seat passenger/car seat can only appear on the left side of the image, car seat appears at a range of pixels away from the detected driver's face, etc. Even for the machine-learning based approach, by isolating the windshield for further processing, the classifier focuses on the relevant differentiating characteristics between violators and non-violators (humans vs. car seat and other features within a car) and not on extraneous features outside of the windshield area to achieve better classification accuracy, with potentially fewer training samples. Hence, it should be appreciated that accurate windshield localization is desired.

Figure 1:
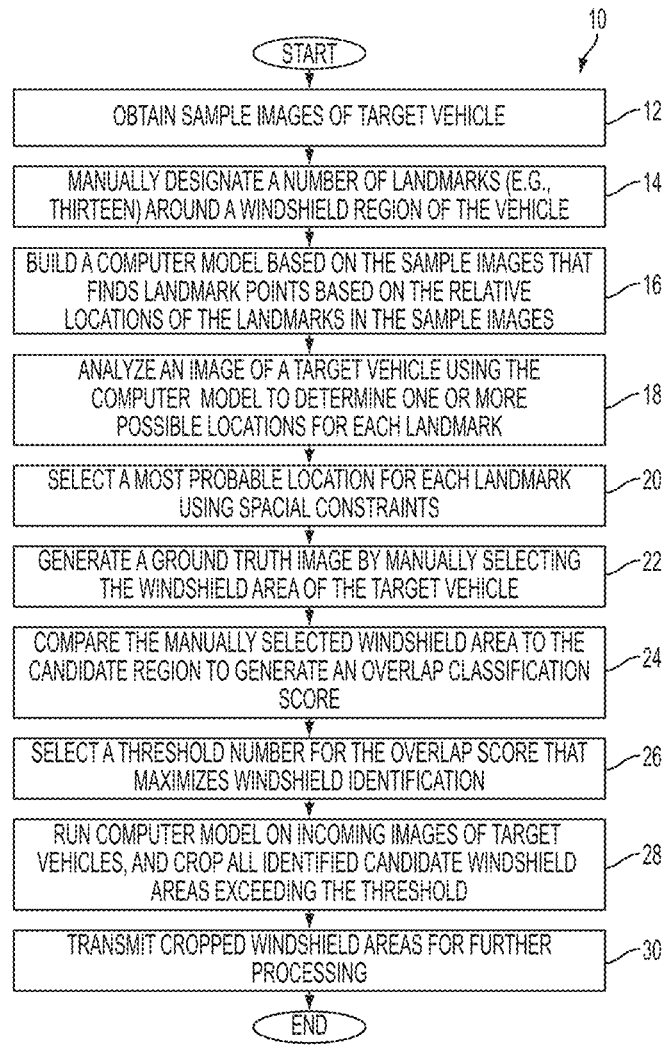
FIG. 1 is a flowchart of an exemplary method in accordance with the present disclosure.

Turning now to the drawings, and initially to FIG. 1, a method 10 in accordance with the present disclosure is illustrated in flowchart form. The method 10 comprises the steps of: obtaining sample images of target vehicles (step 12), manually designating a number of landmarks (e.g., thirteen) around a windshield region of the vehicle (step 14), building a computer model based on the sample images that finds landmark points based on the relative locations of the landmarks in the sample images (step 16), analyzing an image of a target vehicle using the computer model to determine one or more possible locations for each landmark (step 18), selecting a most probable location for each landmark using spatial constraints (step 20); generating a ground truth image by manually selecting the windshield area of the target vehicle (step 22), comparing the manually selected windshield area to the area bounded by the landmarks selected in step 20 to generate an overlap classification score (step 24), selecting a threshold number for the overlap score that maximizes windshield identification (step 26), running the computer model on incoming images of target vehicles and cropping all identified candidate windshield areas exceeding the threshold (step 28), and transmitting the cropped windshield areas for further processing (step 30). These steps will be described in connection with the remaining Figures.

Figure 2:
FIG. 2 is an sample image in accordance with the present disclosure.

In FIG. 2, a typical image is shown that was captured during a road test on a city street. It is noted that even though the windshield of the vehicle has a unique trapezoidal shape, the shape alone is not sufficient to uniquely identify its location in the image because many lines/structures in the scene can often form similar trapezoidal shapes (e.g., roof tops, lines on the pavement, shadows of objects, sun roofs). Hence, in order to detect windshields from cluttered scenes, the present disclosure includes the door mounted rear-view mirrors as part of the windshield for detection purpose.

The red dots on the sample image of FIG. 2 show a set of 13 manually identified landmark points. The landmark points are arranged around the edges of the windshield (e.g., along the roof line, hood line, and A-pillars), and at the outer edge of each of the driver and passenger side rear view mirrors. The number of landmark points can be adjusted based on the complexity of the object in the scene and the amount of unique features to be included. For example, for detecting faces in different poses in an image, more than 30 landmark points are often needed in order to include unique facial features such as nose and eyes.

In windshield localization, the edges are generally straight lines except for the pair of rear-view mirrors. Hence, fewer landmark points can typically be utilized as compared to a facial detection scheme. Too many points can significantly increase the amount of manual work in the training phase and computational cost in the on-line application. Because the relationships between landmark points are processed through dynamic programming, the end points of the sequence of points cannot be connected. However, it has been found that the position of the end points can potentially affect the performance. In the present disclosure, the end points are not positioned near any corners (i.e., the end points are positioned along a side or relatively straight edge). In the illustrated example, the end points are positioned at a midpoint of the hood line.

Once the set of landmark points and their relative locations around the windshield is determined, the 13 landmark points are labeled manually in a set of training images similar to FIG. 2 (e.g., 20-100 images) in the same sequence. These manually labeled images constitute positive samples in the computer model training scheme. In addition to positive samples, negative samples are needed to construct computer model. Therefore, a set of images (negative samples) are selected that do not contain windshield of the car (e.g. empty roads, car roofs, scenes without a car, etc. . . . ). Positive samples are images of a car taken at a geometry similar to the actual capturing geometry and negative samples are images/areas that do not include a car.

Figure 3:
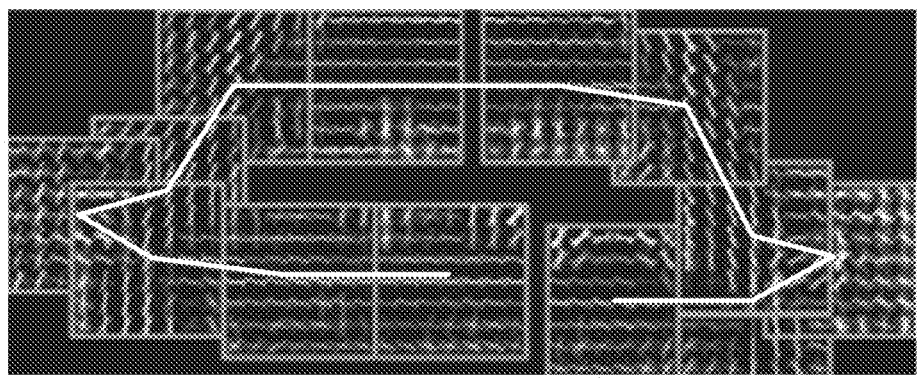
FIG. 3 is a sample image showing landmarks and trees in accordance with the present disclosure.
Figure 4:
FIG. 4 is an exemplary candidate area identified in accordance with the present disclosure.

A model, see Eq. in [0011], is then constructed by learning an appearance template for each of the landmark points (appearance template are learnt using Histogram of Gradient (HOG) features within a predefined window) and the spatial location (and relationship between points) for these landmark points as shown in FIG. 3. Computer model shown in FIG. 3 illustrates how the feature representation (in terms of Histogram of Gradient (HOG) features) should look like for each of the landmark points and also the spatial deformation between the neighboring landmark points. Proposed computer model is constructed using supervised learning algorithm support vector machines (SVMs). By applying the model to incoming images, a list of candidate windshield areas will be identified in each image. An example of the candidate area is shown in FIG. 4 along with a classification score, which will now be described.

Evaluating the Performance of Windshield Localization

In order to measure the accuracy of the windshield localization method, a metric such as Eq. (1) can be used to quantify an error rate by comparing a candidate area to the ground truth (e.g., manually labeled image). In this regard, an operator would manually mark the windshield on the image and compare it to the candidate region. In Eq. (1), "auto" and "manual" correspond to areas identified in the automatic and manual windshield localization processes, respectively.

$$E = \frac{\text{Auto} \cup \text{Manual} - \text{Auto} \cap \text{Manual}}{\text{Auto} \cup \text{Manual}} \quad \text{EQ: 1}$$

Figure 5:
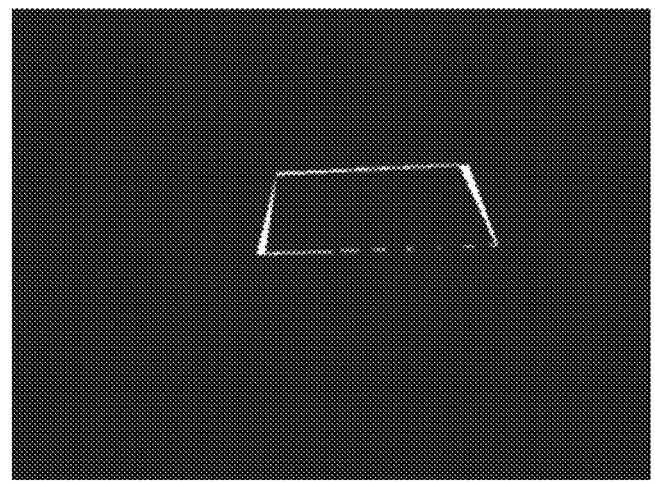
FIG. 5 is an exemplary ground truth image developed in accordance with the present disclosure.
Figure 6:
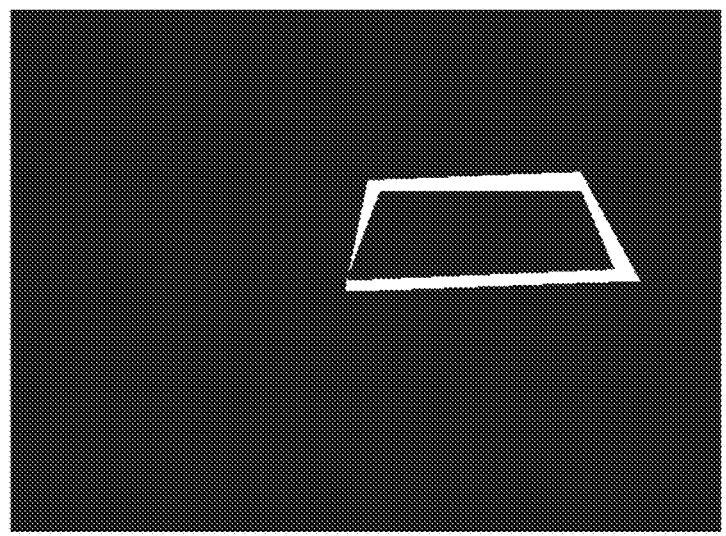
FIG. 6 is another exemplary ground truth image developed in accordance with the present disclosure.

To determine the sensitivity of the metric, a measurement system analysis (MSA) is performed with two operators and ten sample images from a data set to quantify the repeatability and reproducibility errors of the operators. Each operator labels four corner points on a windshield (not including the rear-view mirrors) and repeats the process twice for each image (i.e., each of the four measurements will be considered as "auto" in Eq. (1)). The ground-truth in the MSA study is obtained by averaging the locations of the four measurements for each of the four corner points and considered as "manual" in Eq. (1). A smallest polygon is constructed based on each set of four corner points and the overlap area between two polygons can then be calculated based on Eq. (1). The result of an exemplary MSA is shown in Table 1. Note that the total variation is about 0.04, while the repeatability variation is 0.016, which sets a bound as to whether two windshields are considered the same or not. FIGS. 5 and 6 show two examples of mismatched areas calculated based on Eq. (1) and their corresponding error rate.

TABLE 1

MSA Results
Gage R&R Results

| Source | Standard Deviation | 6 * StDev | % Contribution |
|---|---|---|---|
| Total Variation (TV) | 0.037104 | 0.22263 | 100.00% |
| Total Gage R&R (GRR) | 0.032986 | 0.19791 | 79.03% |
| Repeatability (EV) | 0.016943 | 0.10166 | 20.85% |
| Reproducibility (AV) | 0.028302 | 0.16981 | 58.18% |
| Operator | 0.021469 | 0.12881 | 33.48% |
| Operator * part | 0.018441 | 0.11065 | 24.70% |
| Part to part (PV) | 0.01699 | 0.10194 | 20.97% |

In various tests, windshield regions of 1153 images captured during a road test were automatically identified using the method of the present disclosure. Their areas were compared to the ground truth based on the smallest polygons that could be fitted inside the 4 corner points using Eq. (1). The error rate is shown in FIG. 7 where the horizontal axis is the index of images and the vertical axis is the error rate.

Two examples where the error rate exceeds 0.4 are shown in FIGS. 8 and 9. Note that these kinds of vehicles and their windshields were not used in the particular training set of the windshield model in this example, so the apparent poor matching is not unexpected and could be improved if these kinds of windshields are used in training. Note also that in some applications these kinds of trucks are out of scope for HOV/HOT enforcement and, therefore, identification of the windshield of such trucks is not necessary.

Validating a Candidate Area

It can be seen from FIGS. 8 and 9 that not all identified candidate areas are perfectly overlapping with the true windshield. In these images the error rate exceeds 0.4, with magenta and yellow areas identified manually and automatically, respectively. Furthermore, in some occasions, the captured scene might contain no cars at all (due to mis-firing of a camera triggering device, for example). Hence, it is desirable to determine a measure of confidence that a candidate area is a windshield.

One manner of achieving this is evaluating each particular configuration of parts $L=\{l_i: i \in V\}$ for the given image I by a score function as shown in Eq 2.

Eq 2: $S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, $App(I,L)$ sums the appearance evidence for placing a template for part i at location $l_i$ for $i=1, 2, \ldots, N_L$, and $Shape(L)$ scores the specific spatial arrangement of parts L.

Figure 10:
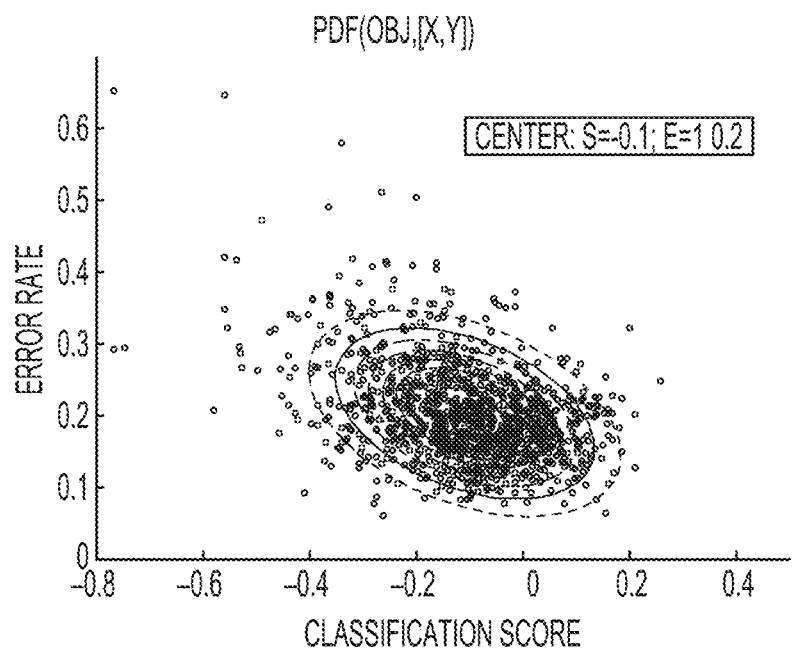
FIG. 10 is a plot of error rate vs. a score function in accordance with the present disclosure.

The configuration that gives the highest score is chosen as the candidate area. FIG. 10 is a plot of the error rate using Eq. (1) against this score function for the 1153 images in the test data set. From FIG. 10, it is apparent that when the score is low, the error rate tends to be high.

Figure 11:
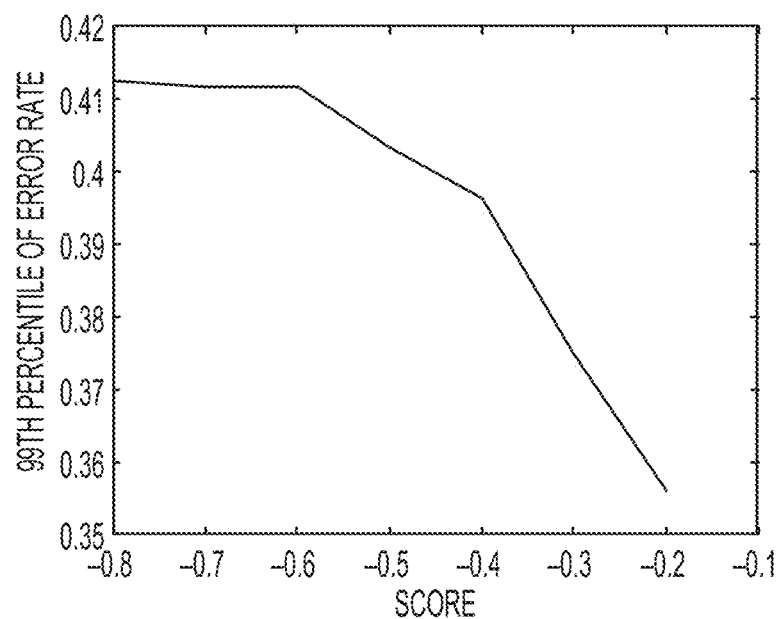
FIG. 11 is a ROC-like curve generated in accordance with the present disclosure.

In FIG. 11, a ROC-like curve was constructed for different score values and the 99 percentile error rate. Using the graph of FIG. 11, a particular score value can be chosen to meet a customer's requirement of yield (percentage of identified windshields out of the total number of images captured) vs. accuracy (percentage of correctly identified windshields).

For example, it may be known that an error less than 0.4 indicates a correct windshield location in almost all cases, thus if a classification score threshold of −0.2 is chosen, almost all declared windshields will be true windshields, however, many true windshields will be incorrectly rejected (false negative). Based on FIG. 10, a score of −0.5 will yield roughly 99% of the windshields declared as windshields to be true windshields, thus capturing a large fraction of the true windshields (high true positive rate), while declaring a very small number of incorrect windshields (low false positive rate).

Figure 12:
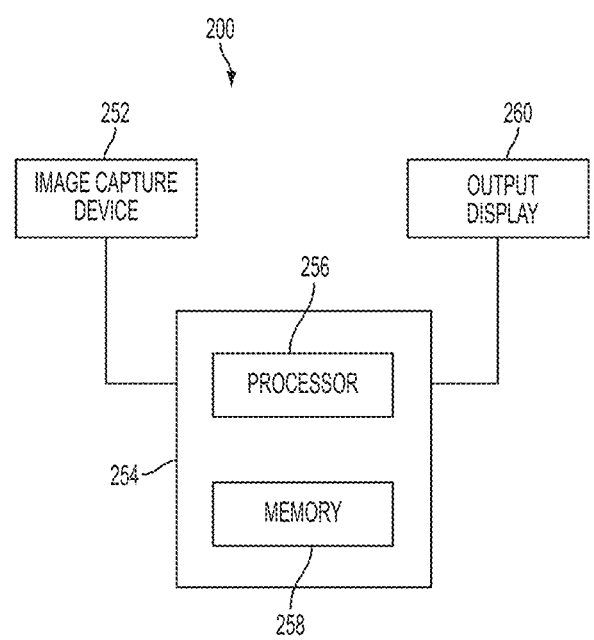
FIG. 12 is an exemplary system in accordance with the present disclosure.

Turning to FIG. 12, a basic system in accordance with the present disclosure is illustrated and identified generally by reference numeral 200. The system 200 generally includes an image capture device 252 coupled to a processing unit 254 that includes both a processor 256 and a memory 258 for storing computer executable instructions to perform the method in accordance with the present disclosure. An output display 260 is provided for displaying the enhanced image. It will be appreciated that the image capture device 252, the processing unit 254 and the output display 260 can be remotely located from one another depending on the particular installation. In some arrangements, some or all of the components can be located together.

Utilizing aspects of the present disclosure has greatly increases the accuracy rate of windshield identification. While prior art systems have been successful at achieving an 85% accuracy rate, testing on systems employing the exemplary methods set forth herein have resulted in 99% or greater accuracy. Accordingly, the present disclosure sets forth system and methods that can greatly improve HOV/HOT lane enforcement.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system configured to perform landmark-based image analysis for localization of a windshield within an image comprising:
    an image capture device operably connected to a data processing device that captures an image of a target vehicle; and
    a processor-usable medium embodying computer code, said processor-usable medium being coupled to said data processing device, said computer program code comprising instructions executable by said processor and configured for:
    identifying a plurality of landmark points associated with a windshield portion of a vehicle, at least one of the landmark points corresponding to at least one side view mirror adjacent the windshield;
    organizing each of the landmark points in a tree structure defined by spatial relationships between the landmark points; and
    calculating a classification score;
    wherein the classification score is generated using:
    $S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, $App(I,L)$ sums the appearance evidence for placing a template for part i at location $l_i$ for $i=1, 2, \ldots, N_L$, and $Shape(L)$ scores the specific spatial arrangement of parts L.

2. A system as set forth in claim 1, wherein the landmark points define a tree having a start and end points each on a straight line segment of said windshield thereby minimizing the impact of relative position variation between tree start and end points on windshield identification.

3. A system as set forth in claim 2, wherein the start and end points of the tree are at a lower center portion of the windshield.

4. A system as set forth in claim 1, wherein said computer program code comprising instructions executable by said processor is further configured for detecting violations of lane requirements in managed lanes.

5. A system as set forth in claim 1, wherein said computer program code comprising instructions executable by said processor is further configured for comparing the classification score to a threshold value and, if the classification score exceeds the threshold value, cropping a region identified by the landmark points.

6. A computer implemented method of enhancing an image comprising: using a data processing device to identify a plurality of landmark points associated with a windshield portion of a vehicle;

using a data processing device to organize each of the landmark points in a tree structure defined by spatial relationships between the landmark points and using a data processing device to calculate a classification score based on the landmark points;

wherein the classification score is generated using:

$S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, $App(I,L)$ sums the appearance evidence for placing a template for part i at location $l_i$ for $i=1, 2, \ldots, N_L$, and $Shape(L)$ scores the specific spatial arrangement of parts L.

7. A computer implemented method as set forth in claim 6, further comprising comparing the classification score to a threshold value and, if the classification score exceeds the threshold value, cropping the region identified by the landmark points.

8. A computer implemented method as set forth in claim 6, wherein the landmark points define a tree having a start and end points each on a straight line segment of said windshield thereby minimizing the impact of relative position variation between tree start and end points on windshield identification.

9. A computer implemented method as set forth in claim 8, wherein the start and end points of the tree are at a lower center portion of the windshield.

10. A computer implemented method as set forth in claim 6, further comprising detecting violations of lane requirements in managed lanes.

11. A non-transitory computer-usable medium for performing landmark-based image analysis for localization of a windshield within an image, said computer-usable medium embodying a computer program code, said computer program code comprising computer executable instructions configured for:

identifying a plurality of landmark points associated with a windshield portion of a vehicle using an elastic deformation model, at least one of the landmark points corresponding to at least one side view mirror adjacent the windshield;

organizing each of the landmark points in a tree structure defined by spatial relationships between the landmark points; and calculating a classification score based on the landmark points;

wherein the classification score is generated using:

$S(I,L)=App(I,L)+Shape(L)$, where I is the image of interest, and $L=\{l_i=(x_i,y_i), i=1, 2, \ldots, N_L\}$ is the set of pixel locations for the $N_L$ landmarks defined for the windshield, $App(I,L)$ sums the appearance evidence for placing a template for part i at location $l_i$ for $i=1, 2, \ldots, N_L$, and $Shape(L)$ scores the specific spatial arrangement of parts L.

12. A non-transitory computer-usable medium as set forth in claim 11, wherein the instructions further comprise comparing the classification score to a threshold value and, if the classification score exceeds the threshold value, cropping the region identified by the landmark points.

13. A non-transitory computer-usable medium as set forth in claim 11, wherein the landmark points define a tree having a start and end points each on a straight line segment of said windshield thereby minimizing the impact of relative position variation between tree start and end points on windshield identification.

14. A non-transitory computer-usable medium as set forth in claim 11, wherein the start and end points of the tree are at a lower center portion of the windshield.

* * * * *